March 22, 1966     K. KIRCHNER     3,241,390
MEANS FOR CHANGING THE DRIVE OF A SCREEN WIPER FROM CONSTANT
TO INTERMITTENT WIPING, MORE ESPECIALLY FOR MOTOR VEHICLES
Original Filed July 23, 1963

Inventor:
Karl Kirchner,

By *[signature]*,
His Attorney.

United States Patent Office 3,241,390
Patented Mar. 22, 1966

3,241,390
MEANS FOR CHANGING THE DRIVE OF A SCREEN WIPER FROM CONSTANT TO INTERMITTENT WIPING, MORE ESPECIALLY FOR MOTOR VEHICLES
Karl Kirchner, Schanzstrasse 2, Friedrichshafen (Bodensee), Germany
Continuation of application Ser. No. 297,044, July 23, 1963. This application July 28, 1965, Ser. No. 475,546
Claims priority, application Germany, July 31, 1962, K 47,393; June 24, 1963, K 50,039
18 Claims. (Cl. 74—436)

This application is a continuation of my application Serial 297,044, filed July 23, 1963, claiming a priority under 35 U.S.C. 119 of a filing in Germany of July 31, 1962.

The constant wiping of windshields of motor vehicles is only necessary with medium and heavy rain. With light rain, snowfall and mist, it is completely adequate if the windshield is wiped at certain intervals. The wiping at intervals has in such cases not only the advantage that the driver retains better vision along the road and is less disturbed, but also that the windshield and the rubber wipers are spared.

Windshield wiper drive units are known in which the wiper motor is briefly placed under voltage by actuating a push button in order to produce an intermittent wiping. This push button can also switch on a time relay or set a clockwork mechanism in operation, which interrupts the circuit of the wiper drive at certain intervals. However, such switching arrangements are readily susceptible to breakdown and in addition are relatively costly.

The invention has for its object to provide a robust switching arrangement for screen wiper drive units, with which the aforesaid disadvantages are avoided. It is to occupy only little space, is to be cheap, have a long life, and it must be of such size that it can be easily fitted into the hitherto usual wiper drive housings.

In accordance with the invention, an intermittent wiper drive can be constructed as follows:

(a) The selection of mode of operation, i.e., whether continuous or intermittent, is determined by the direction of rotation of a reversible motor. A drive gear, or drive wheel, adapted to be driven by the motor, is provided. Arranged in the middle of the driving gear is a cylindrical projection, in a central bore of which is mounted a stud of the wiper shaft. Direction sensitive clutch means are provided; on each of the two sides of this bore there is an eccentrically mounted driver lever which is under spring pressure and which can be swung out by a small angle. These levers, with the spring compressed, do not project beyond the periphery of the aforesaid cylindrical projection, the radius of which is smaller than the spacing of the driver of the wiper shaft from the axis thereof.

(b) The two driver levers which are of different thickness swing outwardly under the pressure of the spring in opposite directions to such an extent that with rotation of the driving gear, they run up against a driver pin, or driver member of the wiper shaft and drive this shaft intermittently or continuously, according to the direction of rotation of the driving motor.

(c) An indexing means is provided: fixed on the driving gear in the vicinity of its cylindrical projection is an indexing pin which engages in the radial slots of the star wheel of a Geneva movement, the shaft of whch is fixed on the cover of the screen wiper housing and extends parallel to the wiper shaft.

(d) A camming arrangement prevents engagement of the levers, when the motor is running in the "intermittent" direction. A co-axial camming disc is secured to the star wheel. It is so shaped and arranged that it holds the thicker of the two driver levers, effective during the wiping at intervals, in its inwardly swung, not-engaging position and releases it, by means of a recess, for swinging outwardly only in a predetermined position of the star wheel.

A switching over from continuous wiping to wiping at intervals is therefore effected merely by reversing the polarity of the electric driving motor. If the driving gear is rotated in the direction in which the driver lever not engaged by the camming disc and, therefore, disposed in the outwardly swung position is bearing on the driver member of the wiper shaft, then continuous wiping takes place as long as current is supplied to the driving motor. If the driving shaft of the motor is rotated in the opposite direction, then it is only the second thicker driver lever, which can swing out in the opposite direction from its neutral position, like the other driver lever, which is able to bear against the driver of the wiper shaft. It is then wiping at intervals which then take place because it is only in the position where the camming disc has a recess, which corresponds to only one position of the Geneva star gear that the thicker driver lever is freed, by the recess in the disc for outward swinging movement and engagement with the wiper driver. In the other positions of the star gear, the thicker driver lever is held by the disc in its inward, ineffective, or de-clutched position in which it cannot engage the driver member of the wiper shaft.

One example of a design is shown in the accompanying drawings, wherein.

Figure 1:
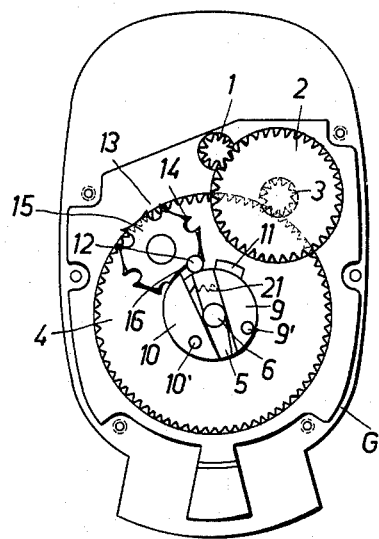
FIGURE 1 is a plan view of the arrangement constructed according to the invention, seen in the direction of the wiper shaft with the housing cover removed.
Figure 2:
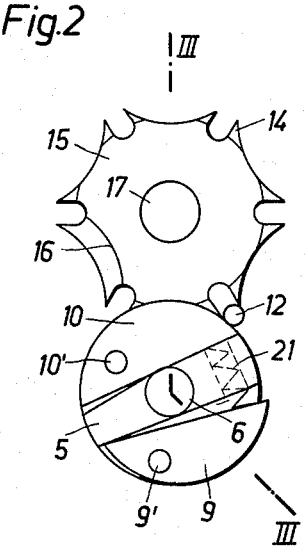
FIGURE 2 is a plan view of the Geneva movement star gear and the driver lever, on an enlarged scale.
Figure 3:
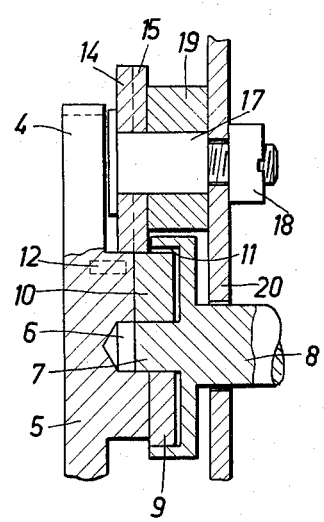
FIG. 3 is a longitudinal section, partly broken away, through the apparatus along the line III—III of FIGURE 2, likewise on a larger scale.

In FIGURE 1, the reference G designates the wiper drive unit housing, which comprises a cover 20, indicated in section in FIG. 3. In the views shown in FIGS. 1 and 2, the housing cover 20 is removed. For easier reading of the figures, the electric driving motor for the screen wiper shaft 8 (see FIG. 3) is not illustrated in FIG. 1. There is merely indicated the driving pinion 1 of this motor, which drives the driving wheel, or gear 4 for the wiper shaft 8 through the gearwheels 2 and 3.

Arranged in the middle of the driving gear 4 is a cylindrical projection 5, having a central bore 6, in which is mounted a pin 7 of the wiper shaft 8. Eccentrically mounted on each of the two sides of the bore 6, and on the projection 5 are driver levers 9 and 10, these levers being under pressure of a spring 21 and adapted to swing out through a small angle. As can be seen from FIGS. 1 and 2, the two driver levers 9 and 10 are lobeshaped, and as shown, form segments of a circle and are adapted to pivot about pins 9' and 10'. When the spring 21 is compressed, the two levers do not project beyond the periphery of the aforementioned cylindrical projection 5. A driver member, or driver pin 11 is secured to wiper shaft 8. The radius of projection 5 is smaller than the distance of the driver 11 of the wiper shaft 8 from its axis.

As can be seen from FIG. 3, the two driver levers 9 and 10 are of different thicknesses and, under the pressure of the spring 21, swing outwardly in opposite directions to such an extent that, with rotation of the driving gear 4, they run up against the driver 11 of the wiper shaft 8 and drive this shaft continuously or intermittently, as will appear below, depending on the direction of rotation of the driving motor. Drive levers 9, 10, and driver member 11 thus form a direction-of-rotation sensitive clutch.

In FIG. 1, the thicker driver lever 10 is shown in the outwardly swung position. If the driving gear 4 is driven in a clockwise direction, then the outwardly swung end of the lever 10 engages the driver 11 of the wiper shaft and drives the latter intermittently, as will later be more fully explained. In FIG. 2, it is the other less thick driver lever 9 which is shown in the outwardly swung position. If the driving gear 4 is driven in a counter-clockwise direction, then the outwardly swung end of the lever 9 engages the driver 11 of the wiper shaft 8 and drives the latter continuously as long as the driving motor is under voltage. Therefore, this is the lever position for continuous wiping.

Fixed on the driving gear 4 in the vicinity of its cylindrical projection 5 is a vertical drive or index pin 12, which engages in the radial slots of the star wheel 14 of a Geneva movement. Star wheel 14 is rotatable on a shaft 17 which, as can be seen from FIG. 3, is fixed on the cover 20 of the screen wiper housing G by means of a nut 18 and extends parallel to the wiper shaft 8.

Connected to the star wheel 14 is a co-axial camming disc 15, having a recess 16 located between a pair of slots of star wheel 14. Disc 15 is so shaped and arranged that only the thicker driver lever 10, effective for wiping at intervals, is cammed inwardly by sliding thereagainst. Thus, lever 10 is in its inwardly swung position, i.e. the neutral position shown in FIG. 2, the lever only being released for swinging outwardly when the star wheel 14 is in a position in which the external periphery of the disc 15 has the recess 16.

Arranged between the disc 15 and the cover 20 of the drive housing is a spacer sleeve 19, for the disc 15 is intended only to influence the position of the thicker driver lever 10, but not the position of the driver lever 9. Driver lever 9 engages the driver pin 11 of the wiper shaft 8 to drive shaft 8 for continuous wiping when the lever 9 is in its outwardly swung position shown in FIG. 2 with the driving gear 4 rotating in a counter-clockwise direction.

If it is desired to change over from continuous wiping to wiping at intervals, it is only necessary to actuate a push button (not shown), which reverses the wiper driving motor. The driving gear 4 now rotates in a clockwise direction and the driver lever 9 passes by the driver member 11 without driving the same and thus without driving the wiper shaft 8. The star wheel 14 is permanently coupled through the index pin 12 to the driving gear 4. Wiper shaft 8 is only driven when star wheel 14 has indexed to such a degree that the recess 16 of disc 15, secured to star wheel 14, permits the driver lever 10 to be swung out into the position illustrated in FIG. 1, under the action of the spring 21. It is only in this position that the lever 10 acts on the driver member 11 of the wiper shaft 8 and drives shaft 8 until the driving pin 12 has advanced the star wheel 14 by one step. According to the gearing ratio of star wheel 14, which may be 1:4, 1:5 or 1:6, the circular camming periphery of the disc 15 holds the driver lever 10 in the neutral position again, as shown in FIG. 2, for three, four or five advancing steps, the wiper shaft 8 not being driven in this position. This period of wiping at intervals is only stopped when either the push button is actuated for reversing the polarity of the driving motor or the motor is stopped.

I claim:

1. Means for changing over the drive of a vehicle screen wiper from continuous to intermittent wiping and vice versa, comprising a wiper shaft, a driving gear for said shaft, a cylindrical projection with a central bore in the middle of said driving gear, said wiper shaft being mounted in said bore, two driver levers of different thickness eccentrically mounted on opposite sides of said bore so that said levers, under spring pressure can swing out through a small angle beyond the periphery of said cylindrical projection to engage a driver for the wiper shaft when the driving gear is rotated, one or other of the driver levers engaging said driver to rotate the wiper shaft either intermittently or continuously according to the direction of rotation of the driving gear, a driving pin being fixed on the driving gear adjacent the cylindrical projection thereon which engages in radial slots in the star wheel of a Geneva movement, the axis of which extends parallel to the wiper shaft, and a slide disc with a peripheral recess being fixed coaxially to the said star wheel to hold the thicker of the two driver levers in its inwardly swung neutral position and only to release said lever for outward swinging movement, to effect intermittent wiping, in a position of the star wheel in which said recess is adjacent said lever.

2. Means for changing over the drive of a vehicle screen wiper from continuous to intermittent wiping and vice versa according to claim 1, wherein the two driver levers have the shape of segments of a circle.

3. Means for changing over the drive of a vehicle screen wiper from continuous to intermittent wiping, and vice versa, according to claim 1, wherein, during intermittent wiping, the circular position of the periphery of the slide disc holds the thicker of the two driver levers in the neutral position for a number of advancing steps of the Geneva movement according to the gearing ratio thereof.

4. Means for changing over the drive of a vehicle screen wiper from continuous to intermittent wiping and vice versa, according to claim 1, wherein the driver for the wiper shaft is formed by the outer portion of a radial member integral with said shaft, said outer portion extending parallel with the wiper shaft and the radius of the projection on the driving gear being smaller than the spacing of said portion from the axis of the wiper shaft so that the driver is adjacent the curved periphery of the driver levers when the spring between said levers is compressed.

5. Means for changing over the drive of a vehicle screen wiper from continuous to intermittent wiping and vice versa, according to claim 1, wherein the shaft of the Geneva movement is fixed on the cover of the screen wiper housing.

6. An intermittent windshield wiper transmission producing dwell periods between wiper cycling transmitting motion from a motor to a wiper blade comprising a wiper output shaft; and output wheel; clutching means fro controlling operative connection between said output wheel and said output shaft, operating cam and cam follower means, one of said cam means being responsive to motor operation, the other of said cam means intermittently actuating said clutching means to effect intermittently operative engagement of said output wheel with said wiper output shaft.

7. An intermittent, selective windshield wiper transmission as claimed in claim 6, said clutching means including direction-of-rotation sensitive transmission means associated with said wiper output shaft and said output wheel to effect rotation transmitting connection when said wheel is turning in a first direction, said other of said cam means being effective to transmit motion intermittently when said wheel is turning in the opposite direction.

8. A selective windshield wiper transmission providing for intermittent or continuous operating modes depending on the direction of rotation of a reversible drive motor, comprising a wiper output shaft; a drive wheel adapted to be driven in either direction by said reversible motor; direction of rotation sensitive first clutch means operatively engaging said wheel and said shaft when said wheel is driven in a first direction; index means driven by said wheel; and direction of rotation sensitive second clutch means operatively connecting said wheel and said shaft when said wheel is driven in the opposite direction; and camming means controlling said second clutch means and controlled by said index means disabling connection between said wheel and said shaft unless said index means is in a predetermined position.

9. A selective transmission as claimed in claim 8, wherein said index means includes an index pin secured to said wheel and a Geneva star wheel arranged for engagement by said pin; and said camming means are camming surface means connected to said Geneva movement star wheel actuating said second clutch means to disable connection between said wheel and said shaft unless said Geneva movement star wheel is in a predetermined indexed position.

10. A selective transmission as claimed in claim 8, wherein said first and second clutch means include a pair of levers secured to said drive wheel, and a driver member secured to said wiper output shaft, said levers being movable into and out of engagement with said driver member to effect selective engagement therewith.

11. A selective transmission as claimed in claim 10, wherein said driver levers are a pair of substantially semi-circular lobes mounted on said drive wheel and having sliding surfaces to slide past said driver member and engagement surfaces to engage said driver member, said engagement surfaces being effective on respective lobes in accordance with the direction of rotation of the output wheel.

12. In a windshield wiper system providing selectively intermittent or continuous wiping action, a reversible drive motor; a wiper output shaft; a pair of direction sensitive clutch means coupling said motor to said output shaft in accordance with the direction of rotation of said motor, and camming means associated with one of said clutch means and effective to intermittently disable engagement of said clutch means whereby, when said motor is running in the direction to engage said first clutch means, the output shaft will be driven only when said clutch means is not disabled, thereby providing for intermittent wiper operation with continuous operation of said motor.

13. In a windshield wiper system as claimed in claim 12, index means driven by said motor, said index means being coupled to said camming means and controlled thereby to cause intermittent engagement and disabling of said first clutch means.

14. In a system as claimed in claim 13, said index means including a Geneva movement star wheel having camming disabling surfaces formed on a portion thereof to prevent engagement of said first clutch means when said star wheel is in predetermined indexed positions.

15. In a windshield wiper system providing selectively intermittent, or continuous wiper action, a reversible drive means; a wiper shaft; clutch means coupling said wiper shaft to said drive means for continuous engagement upon rotation of said shaft in a first direction, and intermittently coupling said wiper shaft to said drive means upon rotation of said shaft in the opposite direction.

16. In a windshield wiper system as claimed in claim 15, index means operatively connected to said drive means and controlling said clutch means upon rotation of said shaft in said opposite direction to control engagement and disengagement periods of said clutch means.

17. In a windshield wiper system as claimed in claim 16, said index means including a Geneva movement.

18. In a windshield wiper system as claimed in claim 16, camming means associated with said index means and engaged by said clutch means to control engagement and disengagement periods of said clutch means upon rotation of said shaft in said opposite direction.

References Cited by the Examiner
UNITED STATES PATENTS

| | | | |
|---|---|---|---|
| 1,588,399 | 6/1926 | Anderson | 74—81 |
| 2,987,747 | 6/1961 | Oishei et al. | 15—250.16 |
| 3,091,792 | 6/1963 | Gute | 15—250.17 |
| 3,110,056 | 11/1963 | Oishei et al. | 15—250.12 |

DAVID J. WILLIAMOWSKY, *Primary Examiner.*

DON A. WAITE, *Examiner.*

L. H. GERIN, *Assistant Examiner.*